Patented Oct. 11, 1927.

1,645,030

UNITED STATES PATENT OFFICE.

ROBERT L. TAYLOR, OF PITTSBURGH, PENNSYLVANIA, ASSIGNOR, BY DIRECT AND MESNE ASSIGNMENTS, TO TOUPET-TAYLOR ENGINEERING COMPANY, A CORPORATION OF PENNSYLVANIA.

PREPARED FIREPROOF MORTAR.

No Drawing. Application filed January 5, 1923, Serial No. 610,903. Renewed August 13, 1927.

This invention relates to mortars, and more particularly to what I term a prepared fire-proof mortar.

One of the main objects of the invention is to provide a mortar which is capable of resisting temperatures as high as 2200° F. and which may be used for either interior or exterior work, or both. A further object is to provide a mortar which may be readily produced in large quantities at small cost. Another object is to produce a mortar the principal ingredient of which is a substance which is at present a waste product and is available in large quantities thus rendering it possible to produce the mortar at very low cost.

One of the ingredients which I use in my mortar is what is known locally as "red dog". This material results from the burning of the piles of waste produced from coal mines, this material frequently taking fire by spontaneous combustion. The "red dog" is the product which remains after the waste from the mine has been burnt. This product is available in practically unlimited quantities and, at present, mine operators are frequently put to considerable expense in disposing of this waste product. I have discovered that this product possesses considerable bonding qualities and is also capable of resisting very high temperatures.

In mining soft coal, great quantities of waste materials are accumulated, which form piles or dumps frequently containing many thousands of tons of waste. This waste material is composed largely of slate removed from the mine, but it also includes some coal, slack or cuttings of coal from the mining operations, sulphur, and other waste materials. These dumps frequently catch fire due to spontaneous combustion, and the combustible substances are burned out. The substance which remains after the waste materials have been burned is of a decidedly red color, and is known in the soft coal regions as "red dog". While there will necessarily be some variation in the proportions of the various ingredients between samples of "red dog" taken from different piles or localities, the following is an analysis of a sample of this substance:—

|  | Per cent. |
|---|---|
| Silica | 62.12 |
| Alumina | 33.75 |
| Oxide of iron | 2.00 |
| Lime | 1.09 |
| Magnesia | .04 |
| Loss by ignition | 1.00 |

Another product, which is at present a waste product and available in large quantities and which I use in my mortar is ferromanganese slag. This is a waste product produced in the manufacture of ferro-manganese. The slag is drawn from the upper portion of the furnace, which is tapped to discharge this slag. The slag is preferably discharged into a trough of flowing water. The sudden cooling of the slag as it enters the water causes it to become granulated and this granulated slag is then discharged into a suitable receptacle or tank from which it may be removed at suitable times in any suitable or preferred manner. This slag is at present a waste product and, like the "red dog", possesses high bonding qualities. It is also capable of withstanding very high temperatures. A typical analysis of ferromanganese slag suitable for use in my improved mortar, is as follows:

|  | Per cent. |
|---|---|
| Silica | 25.10 to 28.00 |
| Alumina | 23.40 to 24.20 |
| Lime | 27.04 to 29.47 |
| Magnesia | 7.68 to 7.96 |
| Manganese dioxide | 6.60 to 12.40 |

This slag, as will be noted, has a substantial manganese content, which should not be less than 3%, which imparts a very desirable metallic character to the mortar and materially increases its strength and heat resistant properties.

In carrying out my invention the "red dog" is crushed to about one-eighth of an inch and the ferro-manganese slag is thoroughly dried in a suitable manner. I then mix 75 per cent of "red dog" and 25 per cent slag or 25 per cent "red dog" and 75 per cent slag, by volume, according to the color and grade of mortar desired. The materials are then placed into a suitable rod or ball mill and ground until the mixture has a smooth velvety feeling. This mortar in its dry state after being thoroughly pulverized is ready to use in fire-proof partitions boiler walls and exterior fire-proof construction in general.

For plastering in general and also when a hard finish coat is desired a suitable amount, about 10 per cent by volume of hydrated lime should be added and mixed with the dry material. For exterior work in general side walks and floors a suitable amount of cement, about 10 per cent by volume should be added and mixed thoroughly with the dry material. This mortar can be shipped to the job for the different purposes for which it is suitable. Due to red dog being a calcium material and containing a high percentage of alumina, and ferro-manganese slag containing lime in substantial quantities, this mix of "red dog" and ferro-manganese slag is very satisfactory for interior work. This mortar, in its dry state, after being thoroughly pulverized is ready for use and can be shipped in bags to the point desired where it is mixed with water to produce a mortar of the desired consistency. If desired, though not necessarily, a small proportion of sand or pulverized slag may be added to the wet mix to obtain the desired effect, as is the common practice, but I do not consider this at all necessary. The mortar, when mixed with water, is ready for use without addition of other material and may be used as a wall coating as well as a mortar, producing a very hard and water-proof heat resisting coating.

This mortar has been tested out and has been found to be very satisfactory as a fire resisting and water-proofing material. In addition it may be readily produced at very low cost and provides means for utilizing materials which at present are waste materials and, in many instances, constitute serious nuisances. While I prefer to mix the ingredients in substantially the proportions stated, these proportions can be varied, and cement or lime can be added to the mixture of "red dog" and ferro-manganese slag, to suit the particular work being done.

What I claim is:—

1. A mortar mix containing the residue obtained by burning coal mine slate and waste and commonly known as "red dog", ferro-manganese slag, and a binder.

2. A mortar mix containing the residue obtained by burning coal mine slate and waste and commonly known as "red dog", ferro-manganese slag, and cement.

3. A mortar mix containing the residue obtained by burning coal mine slate and waste and commonly known as "red dog", ferro-manganese slag, and hydraulic cement.

4. A mortar mix containing the residue obtained by burning coal mine slate and waste and commonly known as "red dog", ferro-manganese slag, lime, and hydraulic cement.

5. A mortar mix containing the residue obtained by burning coal mine slate and waste and commonly known as "red dog", and ferro-manganese slag.

In testimony whereof I affix my signature.

ROBERT L. TAYLOR.